US011175411B2

(12) United States Patent
Miya et al.

(10) Patent No.: US 11,175,411 B2
(45) Date of Patent: Nov. 16, 2021

(54) POSITIONING AUGMENTATION DEVICE, POSITIONING AUGMENTATION METHOD, AND COMPUTER READABLE MEDIUM

(71) Applicant: Mitsubishi Electric Corporation, Chiyoda-ku (JP)

(72) Inventors: Masakazu Miya, Chiyoda-ku (JP); Seigo Fujita, Chiyoda-ku (JP); Yuki Sato, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 295 days.

(21) Appl. No.: 16/343,139

(22) PCT Filed: Oct. 28, 2016

(86) PCT No.: PCT/JP2016/082065
§ 371 (c)(1),
(2) Date: Apr. 18, 2019

(87) PCT Pub. No.: WO2018/078795
PCT Pub. Date: May 3, 2018

(65) Prior Publication Data
US 2019/0317224 A1 Oct. 17, 2019

(51) Int. Cl.
*G01S 19/41* (2010.01)
*G01S 19/07* (2010.01)
(Continued)

(52) U.S. Cl.
CPC ............. *G01S 19/41* (2013.01); *G01S 19/07* (2013.01); *G01S 19/08* (2013.01); *G01S 19/44* (2013.01)

(58) Field of Classification Search
CPC .......... G01S 19/41; G01S 19/07; G01S 19/08; G01S 19/09; G01S 19/44; G01S 19/20
(Continued)

(56) References Cited

U.S. PATENT DOCUMENTS 5,982,324 A * 11/1999 Watters .................. G01S 19/41
  342/357.29
6,249,245 B1 * 6/2001 Watters .................. G01S 5/0027
  342/357.4

(Continued)

FOREIGN PATENT DOCUMENTS

JP  2011-242296 A  12/2011
JP  2015-1426 A    1/2015

OTHER PUBLICATIONS

Extended European Search Report dated Apr. 15, 2020 in corresponding European Patent Application No. 16920187.8, 7 pages.
(Continued)

Primary Examiner — Harry K Liu
(74) Attorney, Agent, or Firm — Oblon, McClelland, Maier & Neustadt, L.L.P.

(57) ABSTRACT

A correction generation unit generates an amount of correction for a phase pseudorange between a positioning satellite and each of a plurality of evaluation points, as an amount of evaluation point correction for each of the plurality of evaluation points, based on a carrier phase of a positioning signal observed at each of a plurality of electronic reference points. A reference calculation unit calculates a difference between the phase pseudorange between the positioning satellite and each of the plurality of evaluation points and a geometric distance between the positioning satellite and each of the plurality of evaluation points, as an amount of reference correction for each of the plurality of evaluation points. A ranging error calculation unit removes a bias component due to ambiguity from a difference between the amount of evaluation point correction and the amount of reference correction and thereby calculates a ranging error at each of the plurality of evaluation points.

17 Claims, 9 Drawing Sheets

(51) Int. Cl.
*G01S 19/08* (2010.01)
*G01S 19/44* (2010.01)

(58) Field of Classification Search
USPC .................................................. 342/357.44
See application file for complete search history.

(56) References Cited

U.S. PATENT DOCUMENTS

| | | | | |
|---|---|---|---|---|
| 2009/0135057 A1* | 5/2009 | Vollath | ............... | G01S 19/32 342/357.27 |
| 2012/0286991 A1* | 11/2012 | Chen | ............... | G01S 19/07 342/357.23 |

OTHER PUBLICATIONS

International Search Report dated Jan. 31, 2017 in PCT/JP2016/082065 filed on Oct. 28, 2016.

Fujita, S. et al., "The development status of Japanese QZSS Centimeter Level Augmentation Service (CLAS)—Design of Integrity Function—," Proceedings of 60th Space Sciences and Technology Conference, The Japan Society for Aeronautical and Space Sciences, Sep. 2016, 4 total pages (with English Abstract).

Fujita, S. et al., "3K07 The development status of Japanese QZSS Centimeter Level Augmentation Service (CLAS)—Design of Integrity Function—," Presentation material presented at 60th Space Sciences and Technology Conference, Sep. 2016, 44 total pages (with English translation).

Fujita, S. et al., "Design of Integrity Function on Centimeter Level Augmentation Service (CLAS) in Japanese Quasi-Zenith Satellite System," Proceedings of the 29th International Technical Meeting of The Satellite Division of the Institute of Navigation (ION GNSS+ 2016), Sep. 2016, pp. 3258-3263, 6 total pages.

Fujita, S. et al., "Design of Integrity Function on Centimeter Level Augmentation Service (CLAS) in Japanese Quasi-Zenith Satellite System" (ION GNSS+ 2016), Sep. 2016, 25 total pages.

Miya, M. et al., "The development status of Japanese QZSS Centimeter Level Augmentation Service (CLAS)—Design of Integrity Function—," Proceedings of 59th Space Sciences and Technology Conference, The Japan Society for Aeronautical and Space Sciences, Oct. 2015, 5 total pages (with English Abstract).

* cited by examiner

Fig. 5

| SATELLITE TO BE AUGMENTED | REGION | | | | | | | | | | | | SATELLITE ANOMALY DETERMINATION | NOTES |
|---|---|---|---|---|---|---|---|---|---|---|---|---|---|---|
| | 1 | 2 | 3 | 4 | 5 | 6 | 7 | 8 | 9 | 10 | 11 | 12 | | |
| 1 | 1 | 1 | 1 | 1 | 1 | 1 | 1 | 1 | 1 | 1 | 1 | 1 | NORMAL | DUE TO SETTING OF "1" IN ALL REGIONS |
| 2 | 0 | 0 | 0 | 1 | 1 | 1 | 1 | 1 | 1 | 1 | 1 | 1 | NORMAL | DUE TO SETTING OF "1" IN ALL REGIONS SUBJECTED TO AUGMENTATION |
| 3 | 2 | 2 | 2 | 2 | 2 | 2 | 2 | 2 | 2 | 2 | 2 | 2 | ANOMALOUS | DUE TO SETTING OF "2" IN ALL REGIONS |
| 4 | 0 | 0 | 0 | 2 | 2 | 2 | 2 | 2 | 2 | 2 | 2 | 2 | ANOMALOUS | DUE TO SETTING OF "2" IN ALL REGIONS SUBJECTED TO AUGMENTATION |
| 5 | 1 | 1 | 1 | 1 | 1 | 1 | 1 | 1 | 1 | 1 | 2 | 2 | NORMAL | SATELLITE ANOMALY DENIED DUE TO SETTING OF "2" IN ONLY TWO REGIONS |
| 6 | 1 | 1 | 1 | 1 | 1 | 1 | 1 | 1 | 1 | 1 | 1 | 2 | NORMAL | SATELLITE ANOMALY DENIED DUE TO SETTING OF "2" IN ONLY ONE REGION |
| 7 | 0 | 0 | 0 | 0 | 0 | 0 | 0 | 0 | 0 | 0 | 0 | 0 | ANOMALOUS | DUE TO SETTING OF "0" IN ALL REGIONS |
| 8 | | | | | | | | | | | | | | |
| 9 | | | | | | | | | | | | | | |
| 10 | | | | | | | | | | | | | | |
| 11 | | | | | | | | | | | | | | |
| 12 | | | | | | | | | | | | | | |
| 13 | | | | | | | | | | | | | | |
| 14 | | | | | | | | | | | | | | |

0: NOT SATELLITE TO BE AUGMENTED IN EACH REGION OR LACK OF RANGING ERROR DATA
1: SATELLITE TO BE AUGMENTED IN EACH REGION AND DETERMINED AS NORMAL SATELLITE
2: SATELLITE TO BE AUGMENTED IN EACH REGION AND DETERMINED AS ANOMALOUS SATELLITE

Fig. 6

| ITEM | CONTENT |
|---|---|
| CONDITION 1 | NUMBER OF ANOMALOUS SATELLITES $\geq 3$ |
| CONDITION 2 | NUMBER OF ANOMALOUS GNSS $\geq 2$ |
| CONDITION 3 | NUMBER OF SATELLITES TO BE AUGMENTED EXCLUDING ANOMALOUS SATELLITES $\geq 5$ |

Fig.7

| CASE | DETERMINATION CONDITION | | | ALARM OBJECT |
|---|---|---|---|---|
| | CONDITION 1 | CONDITION 2 | CONDITION 3 | |
| (1) | Yes | No | Yes | - |
| (2) | Yes | No | No | ✔ |
| (3) | Yes | Yes | - | ✔ |
| (4) | No | - | Yes | - |
| (5) | No | - | No | ✔ |
| (6) | - | - | No | ✔ |

POSITIONING AUGMENTATION DEVICE, POSITIONING AUGMENTATION METHOD, AND COMPUTER READABLE MEDIUM

TECHNICAL FIELD

The present invention relates to a positioning augmentation device, a positioning augmentation method, and a positioning augmentation program to augment GNSS (Global Navigation Satellite System) satellite positioning in which positioning satellites such as GPS (Global Positioning System) satellites or quasi-zenith satellites are used.

BACKGROUND ART

Integrity monitoring is important for calculation of reliable position information in satellite positioning. In particular, the integrity monitoring on distribution side for positioning augmentation information is essential for attainment of centimeter level positioning with use of the positioning augmentation information. The integrity monitoring enables distribution of reliable positioning augmentation information and facilitates use of the positioning augmentation information.

Examples of positioning augmentation system including the integrity monitoring are SBAS (satellite-based augmentation system) and GBAS (ground-based augmentation system) for aircrafts. The positioning augmentation information provided by those is intended for code pseudoranges obtained from positioning with use of measurement of radio-wave propagation time and is not subjected to the integrity monitoring compatible with the centimeter level positioning. In the centimeter level positioning, it is essential to ensure reliability of the positioning augmentation information for carrier phase. In order to ensure reliability of positioning correction information, generally, detection of anomalous data is carried out as preprocessing for observed data that is used for generation of the positioning correction information. In positioning on a user side, however, a ranging error in the positioning correction information eventually influences positioning accuracy and it is therefore important to monitor the ranging error on the distribution side for the positioning augmentation information.

According to Patent Literature 1, when a positioning signal propagated beyond an inclined ionospheric layer is found, a pseudorange correction value corresponding to the positioning signal is corrected so as to approximate to a normal distribution and so as to generate a test statistic with use of an ionospheric layer inclination coefficient for a positioning satellite. An integrity monitor detects presence or absence of an anomaly in the positioning satellite with use of the test statistic.

CITATION LIST

Patent Literature

Patent Literature 1: JP 2011-242296

SUMMARY OF INVENTION

Technical Problem

A technique of Patent Literature 1, which is augmentation for the positioning with use of the measurement of the radio-wave propagation time, has a problem in that the centimeter level positioning may not be augmented.

It is an object of the present invention to accurately calculate a ranging error in a phase pseudorange obtained from a carrier phase and to use the ranging error for the augmentation for the centimeter level positioning.

Solution to Problem

A positioning augmentation device to augment positioning with use of a positioning satellite and in a region including a plurality of electronic reference points and a plurality of evaluation points whose position coordinates are respectively specified, according to the present invention, includes:

a correction generation unit to generate an amount of correction for a phase pseudorange between the positioning satellite and each of the plurality of evaluation points, as an amount of evaluation point correction for each of the plurality of evaluation points, based on a carrier phase of a positioning signal sent out from the positioning satellite and observed at each of the plurality of electronic reference points;

a reference calculation unit to acquire a geometric distance between the positioning satellite and each of the plurality of evaluation points, based on the positioning signal sent out from the positioning satellite and observed at each of the plurality of evaluation points, and to calculate a difference between the phase pseudorange and the geometric distance as an amount of reference correction for each of the plurality of evaluation points; and a ranging error calculation unit to remove a bias component due to ambiguity from a difference between the amount of evaluation point correction and the amount of reference correction and to calculate the difference from which the bias component due to the ambiguity has been removed, as a ranging error at each of the plurality of evaluation points.

Advantageous Effects of Invention

According to the positioning augmentation device of the invention, the correction generation unit generates the amount of correction for the phase pseudorange between the positioning satellite and each of the plurality of evaluation points, as the amount of evaluation point correction for each of the plurality of evaluation points, based on the carrier phase of the positioning signal observed at each of the plurality of electronic reference points. The reference calculation unit calculates the difference between the phase pseudorange between the positioning satellite and each of the plurality of evaluation points and the geometric distance between the positioning satellite and each of the plurality of evaluation points, as the amount of reference correction for each of the plurality of evaluation points. The ranging error calculation unit removes the bias component due to the ambiguity from the difference between the amount of evaluation point correction and the amount of reference correction and thereby calculates the ranging error at each of the plurality of evaluation points. Thus an effect by which the ranging error in the phase pseudorange obtained from the carrier phase may be accurately calculated is produced.

BRIEF DESCRIPTION OF DRAWINGS

FIG. 5 is a diagram illustrating a specific example of a determination method in an anomaly determination process S40 according to Embodiment 1.

FIG. 6 is a diagram illustrating a specific example of conditions for determination in an alert generation process S50 according to Embodiment 1.

FIG. 7 is a diagram illustrating a specific example of an alert determination with use of the conditions for determination in the alert generation process S50 according to Embodiment 1.

DESCRIPTION OF EMBODIMENTS

Figure 1:
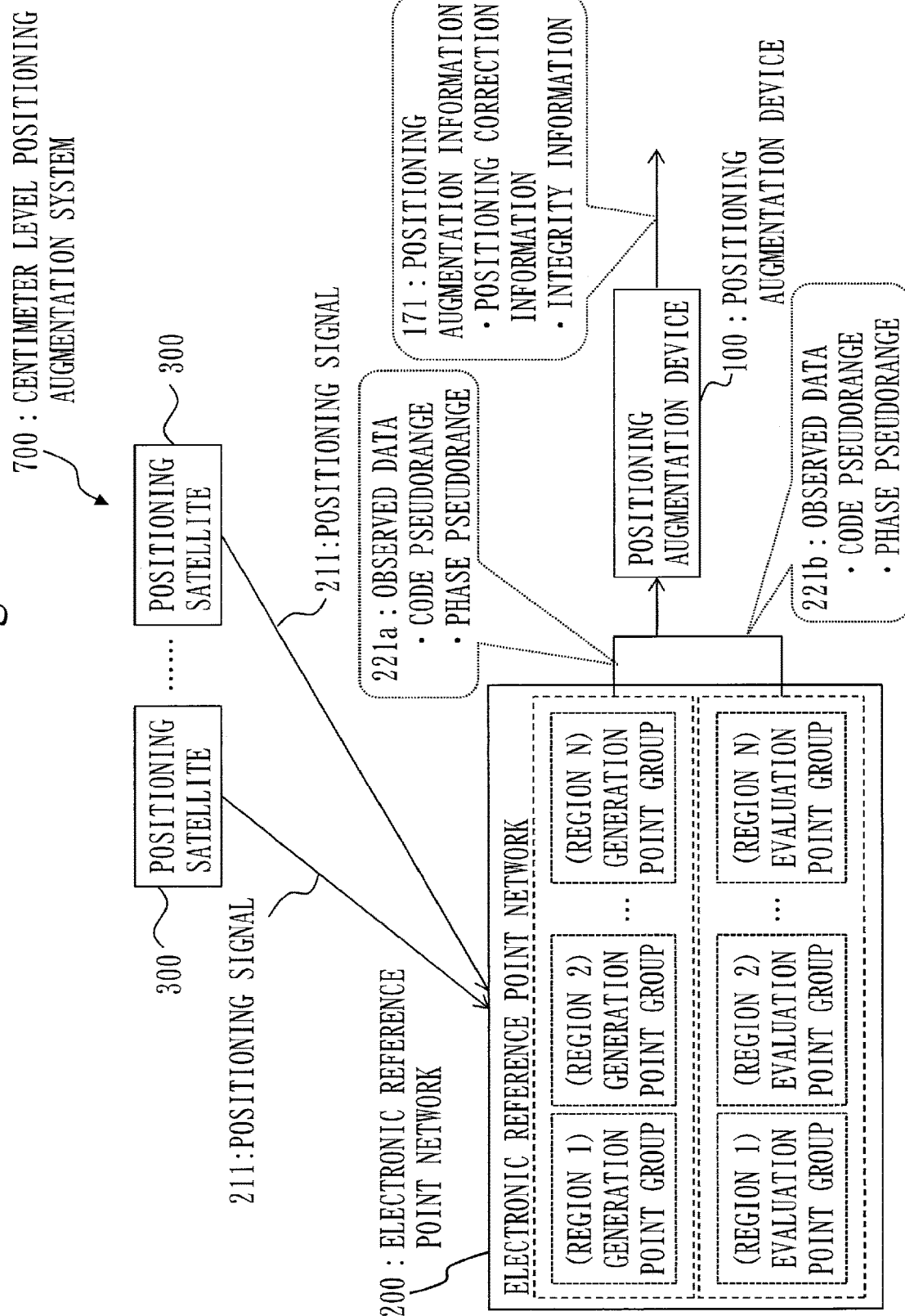
FIG. 1 is an overall configuration diagram of a centimeter level positioning augmentation system 700 in which a positioning augmentation device 100 according to Embodiment 1 is used.

Hereinbelow, an embodiment of the present invention will be described with use of the drawings. In the drawings, identical parts or corresponding parts are provided with identical characters. In description on the embodiment, description on the identical parts or the corresponding parts is omitted or simplified appropriately.

Embodiment 1

*Description of Configuration*

With use of FIGS. 1 and 2, an overall configuration of a centimeter level positioning augmentation system 700 in which a positioning augmentation device 100 according to the present embodiment is used will be described.

A centimeter level positioning augmentation service that is provided in a positioning satellite system is a service by which positioning augmentation information for obtainment of centimeter level positioning accuracy in multi-GNSS is transmitted with use of augmentation signals from positioning satellites.

The centimeter level positioning augmentation system 700 is composed of a plurality of positioning satellites 300, an electronic reference point network 200, and the positioning augmentation device 100. The positioning satellites 300 send out positioning signals 211. The electronic reference point network 200 receives the positioning signals 211 and generates observed data 221. The positioning augmentation device 100 receives the observed data 221 from the electronic reference point network 200 and generates and outputs positioning augmentation information 171.

In the centimeter level positioning augmentation system 700, a service area is partitioned into a plurality of regions 800, that is, a region 1 through a region N. The electronic reference point network 200 is composed of generation point groups that are each made of a plurality of electronic reference points 21 provided in each of the regions 800 and evaluation point groups that are each made of a plurality of deemed receivers 220 provided in each of the regions 800. The generation point groups are respectively provided in the regions 800 made of the region 1 through the region N and are used for generation of positioning correction information. The evaluation point groups are also respectively provided in the regions 800 made of the region 1 through the region N and are used for evaluation of ranging errors in the positioning correction information.

The electronic reference points are continuous observation points for the positioning satellites and each house an antenna that receives radio waves from the positioning satellites, a receiver, communication equipment, and the like.

In FIG. 1, the plurality of electronic reference points 21 in the generation point group that is used for the generation of the positioning correction information in each region receive the positioning signals 211 sent out from the positioning satellites 300, generate the code pseudoranges and the phase pseudoranges as observed data 221a, and output the code pseudoranges and the phase pseudoranges to the positioning augmentation device 100.

The plurality of deemed receivers 220 in the evaluation point group that are used for the evaluation of the ranging errors in the positioning correction information in each region receive the positioning signals 211 sent out from the positioning satellites 300, generate the code pseudoranges and the phase pseudoranges as observed data 221b, and output the code pseudoranges and the phase pseudoranges to the positioning augmentation device 100.

Herein, the code pseudorange refers to a pseudorange that is obtained from the measurement of the radio-wave propagation time. The phase pseudorange refers to a pseudorange that is obtained from the measurement of the carrier phase.

The positioning augmentation device 100 is a device that provides the centimeter level positioning augmentation service.

The positioning augmentation device 100, into which the observed data 221a outputted by the generation point group and the observed data 221b outputted by the evaluation point group are inputted, outputs the positioning augmentation information 171.

A system including the positioning augmentation device 100 and the positioning satellites that broadcast the positioning augmentation information 171 generated by the positioning augmentation device 100 is also referred to as the centimeter level positioning augmentation system. In the centimeter level positioning augmentation service, integrity information indicating a quality indicator for the positioning correction information is provided in addition to the positioning correction information.

The positioning augmentation device 100 according to the present embodiment augments positioning with use of the positioning satellites 300 and in the regions 800 each including the plurality of electronic reference points 21 and the plurality of evaluation points 22 whose position coordinates are respectively specified. As illustrated in FIG. 2, the positioning augmentation device 100 augments the positioning with use of the plurality of positioning satellites 300. To augment positioning means to generate the positioning augmentation information for augmentation of the positioning.

The positioning satellites 300 are GNSS satellites such as GPS satellites and quasi-zenith satellites.

The electronic reference point network 200 made of the plurality of electronic reference points 21 is provided in the regions 800.

On the evaluation points 22, the deemed receivers 220 are placed and receive the positioning signals from the positioning satellites 300. The deemed receivers 220 placed on the evaluation points 22 may be some of the plurality of electronic reference points. Alternatively, the deemed receivers 220 placed on the evaluation points 22 may be equipment that is newly provided and that has functions similar to functions of the electronic reference points.

With use of FIG. 3, a configuration of the positioning augmentation device 100 according to the present embodiment will be described.

In the present embodiment, the positioning augmentation device 100 is a computer. The positioning augmentation device 100 includes hardware such as a processor 910, a storage device 920, an output interface 940, and a communication device 950. The storage device 920 includes a memory 921 and an auxiliary storage device 922.

The positioning augmentation device 100 includes a correction generation unit 110, a reference calculation unit 120, a ranging error calculation unit 130, an anomaly determination unit 140, an alert generation unit 150, an integrity information generation unit 160, a positioning augmentation generation unit 170, and a storage unit 180, as functional configurations. A first threshold 181 is stored in the storage unit 180. In the following description, functions of the correction generation unit 110, the reference calculation unit 120, the ranging error calculation unit 130, the anomaly determination unit 140, the alert generation unit 150, the integrity information generation unit 160, and the positioning augmentation generation unit 170 are referred to as functions of "the units" of the positioning augmentation device 100. The functions of "the units" of the positioning augmentation device 100 are implemented by software.

The storage unit 180 is implemented by the memory 921. Though the storage unit 180 is implemented by the memory 921 in the present embodiment, the storage unit 180 may be implemented by the memory 921 and the auxiliary storage device 922 or by only the auxiliary storage device 922. Any method of implementing the storage unit 180 may be adopted.

The processor 910 is connected to other hardware through signal lines in order to control other hardware.

The processor 910 is an IC (Integrated Circuit) that carries out arithmetic processing. The processor 910 is a CPU (Central Processing Unit).

The auxiliary storage device 922 is a ROM (Read Only Memory), a flash memory, or an HDD (Hard Disk Drive), specifically. The memory 921 is a RAM (Random Access Memory), specifically.

The output interface 940 is a port to which a cable of display equipment such as a display is connected. Specifically, the output interface 940 is a USB terminal or an HDMI (registered trademark) (High Definition Multimedia Interface) terminal. The display is an LCD (Liquid Crystal Display), specifically.

The positioning augmentation device 100 receives the observed data 221a at the electronic reference points 21 and the observed data 221b at the evaluation points 22 through the communication device 950. The observed data 221b is transmitted to the positioning augmentation device 100 by the deemed receivers 220 on the evaluation points 22. The communication device 950 includes a receiver and a transmitter. Specifically, the communication device 950 is a communication chip or an NIC (Network Interface Card). The communication device 950 functions as a communication unit that communicates data. The receiver functions as a receiving unit that receives the data and the transmitter functions as a transmission unit that transmits the data.

A program that fulfils the functions of "the units" is stored in the auxiliary storage device 922. The program that fulfils the functions of "the units" is also referred to as a positioning augmentation program 520. The program is loaded into the memory, read into the processor 910, and executed by the processor 910. An OS (Operating System) is also stored in the auxiliary storage device 922. At least a portion of the OS is loaded into the memory and the processor 910 executes the program that fulfils the functions of "the units" while executing the OS.

The positioning augmentation device 100 may include the only one processor 910 or may include a plurality of processors 910. The plurality of processors 910 may cooperate to execute the program that fulfils the functions of "the units".

Information, data, signal values, and variable values that indicate results of processes in "the units" are stored in the auxiliary storage device 922, the memory 921, or a register or a cache memory in the processor 910.

Figure 3:
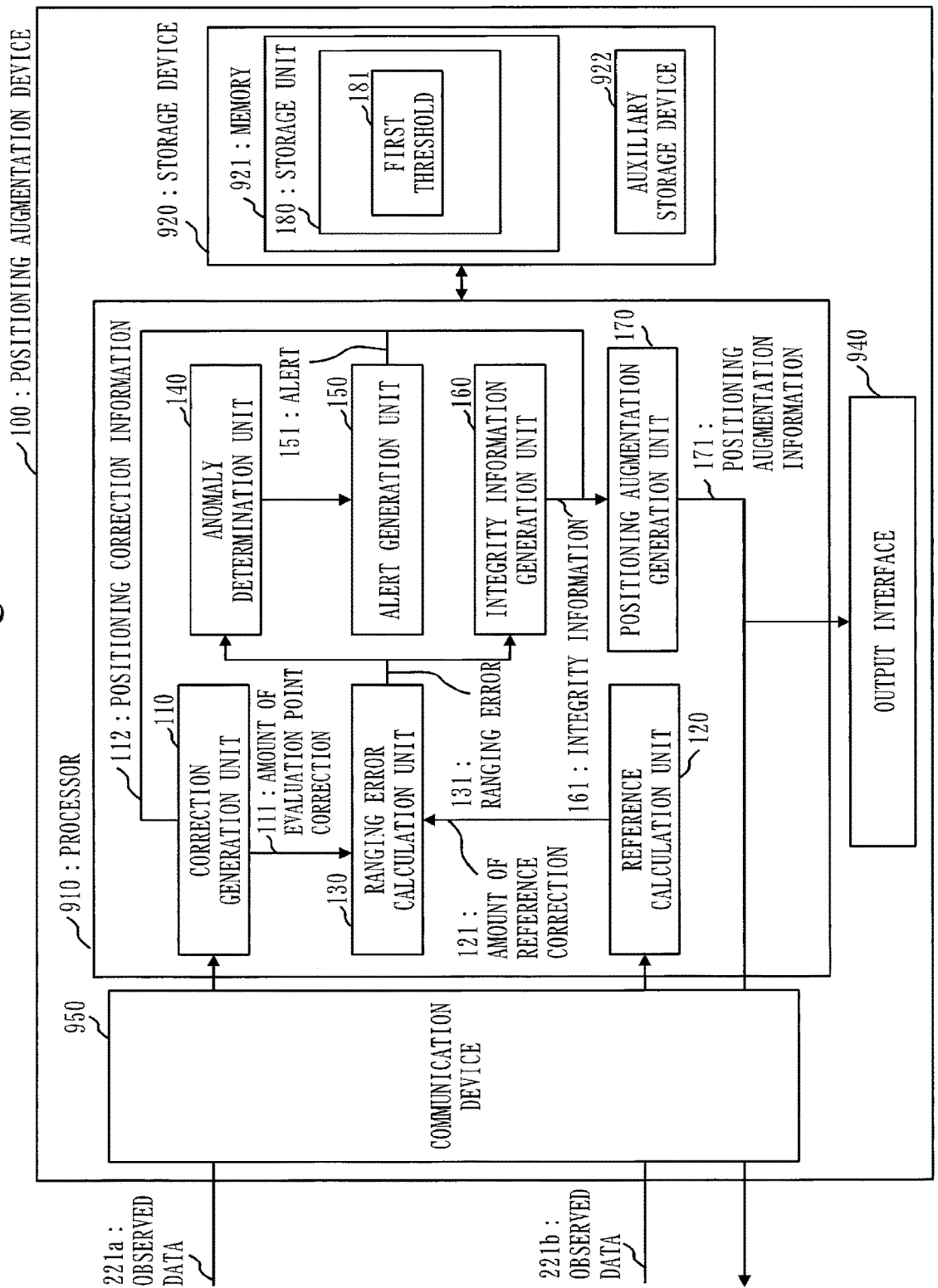
FIG. 3 is a configuration diagram of the positioning augmentation device 100 according to Embodiment 1.

In FIG. 3, an arrow that connects the units and the storage unit 180 represents storage by the units of the results of the processes into the storage unit 180 or readout by the units of information from the storage unit 180. Arrows that make connections among the units represent flow of control.

The program that fulfils the functions of "the units" may be stored in a portable storage medium such as a magnetic disc, a flexible disc, an optical disc, a compact disc, a Blu-ray (registered trademark) disc, or a DVD (Digital Versatile Disc).

What are referred to as positioning augmentation program products are a storage medium and a storage device in which the program that fulfils the functions described as "the units" is recorded and those in which a computer-readable program is loaded, irrespective of forms thereof in appearance.

*Description of Operation*

Figure 4:
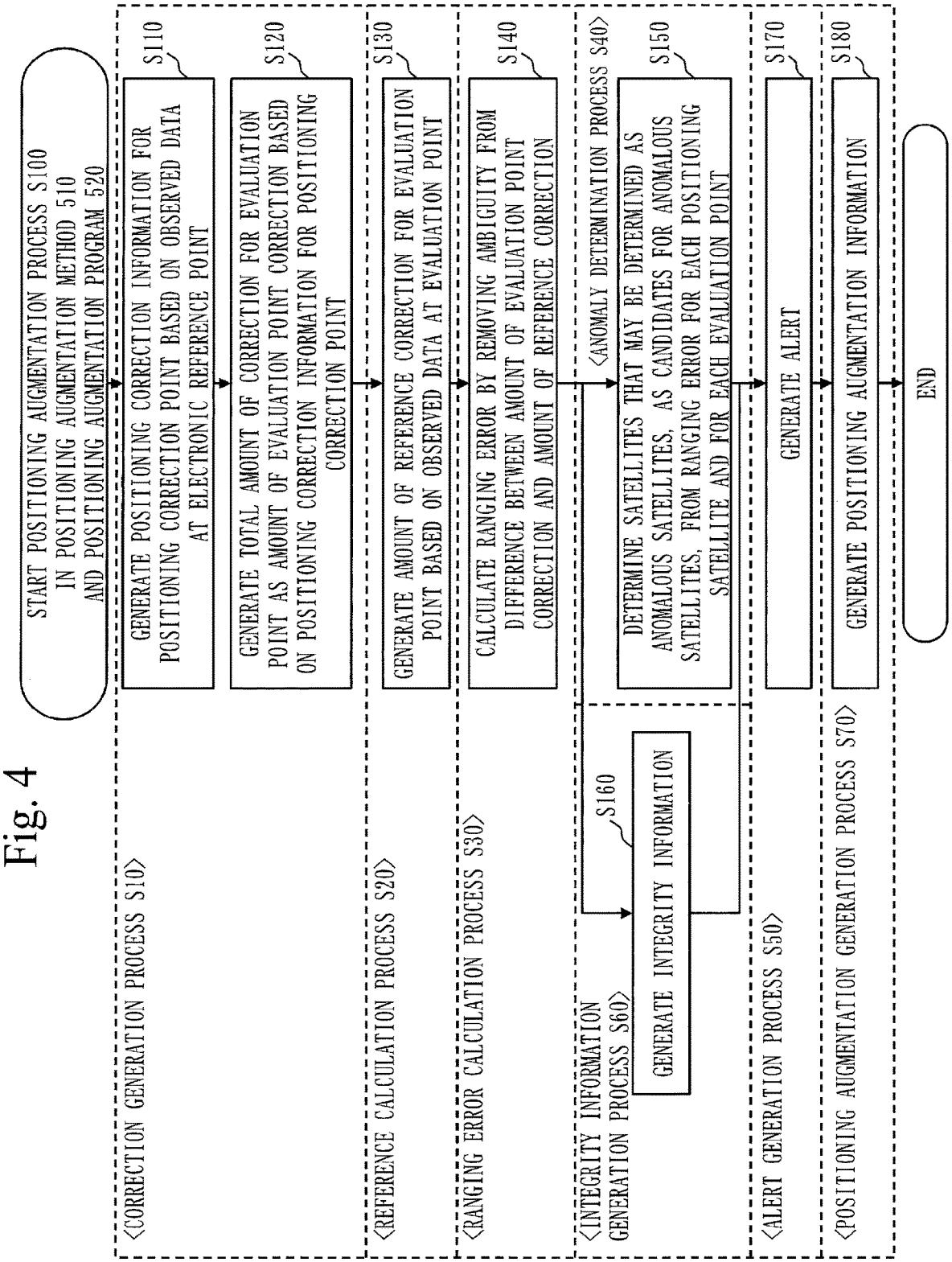
FIG. 4 is a flowchart of a positioning augmentation process S100 in a positioning augmentation method 510 and a positioning augmentation program 520 for the positioning augmentation device 100 according to Embodiment 1.

With use of FIG. 4, a positioning augmentation process S100 in a positioning augmentation method 510 and the positioning augmentation program 520 for the positioning augmentation device 100 according to the present embodiment will be described. In the positioning augmentation process S100, the positioning augmentation device 100 to generate the positioning augmentation information detects an anomaly in integrity based on the ranging errors at the evaluation points of the electronic reference point network with use of the positioning correction information generated for the multi-GNSS and the positioning signals for the electronic reference point network. Herein, the ranging error refers to an error in an amount of correction for the phase pseudorange obtained from the carrier phase.

The positioning augmentation program 520 causes the positioning augmentation device 100 being the computer to execute processes that will be described below. As illustrated in FIG. 4, the positioning augmentation process S100 includes a correction generation process S10, a reference calculation process S20, a ranging error calculation process S30, an anomaly determination process S40, an alert generation process S50, an integrity information generation process S60, and a positioning augmentation generation process S70.

<Correction Generation Process S10>

In the correction generation process S10, the correction generation unit 110 generates the amount of correction for the phase pseudorange 223 between the positioning satellite 300 and each of the plurality of evaluation points 22, as an amount of evaluation point correction 111 for each of the plurality of evaluation points 22, based on the carrier phase of the positioning signal 211 sent out from the positioning satellite 300 and observed at each of the plurality of electronic reference points 21.

Figure 2:
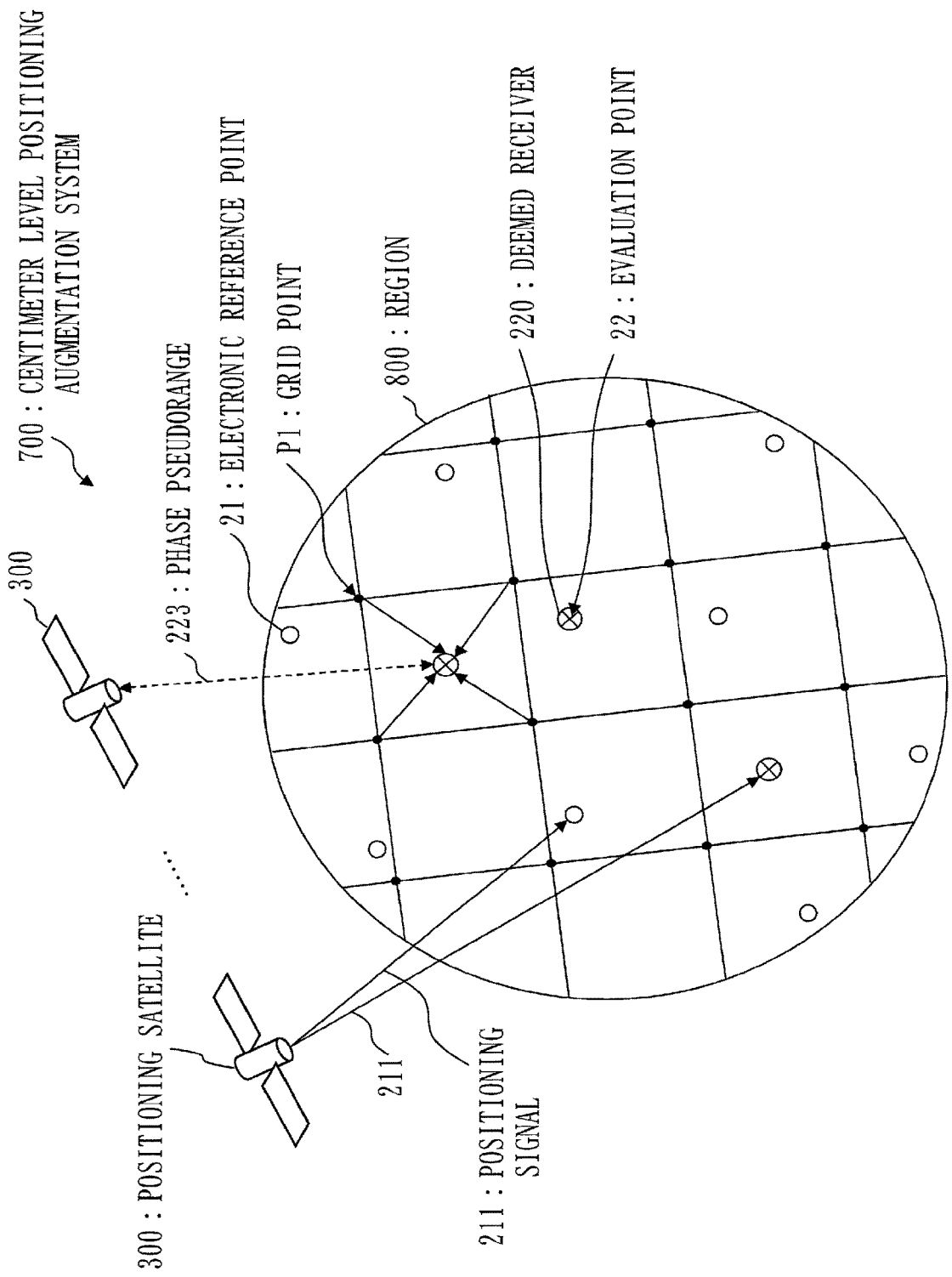
FIG. 2 is a configuration diagram of the centimeter level positioning augmentation system 700 in which the positioning augmentation device 100 according to Embodiment 1 is used, in a region 800.

In the phase pseudorange 223 between the positioning satellite 300 and the evaluation point 22 illustrated in FIG. 2, a satellite orbit error, a satellite clock error, a signal bias error, an ionospheric error caused by ionospheric layers, and a tropospheric error caused by troposphere are included. The satellite orbit error, the satellite clock error, and the signal bias error are errors that are caused by satellites and that are common to all regions and global. The ionospheric error and the tropospheric error are errors that are unique to a region and local.

In step S110, the correction generation unit 110 generates the positioning correction information for a grid point P1 based on the carrier phase of the positioning signal 211 observed at each of the electronic reference points 21. As illustrated in FIG. 2, the grid point P1 refers to each of a plurality of points where the positioning correction information based on the carrier phase is calculated in the region 800 that is to be subjected to the positioning augmentation.

In step S120, the correction generation unit 110 calculates a total amount of correction for the evaluation point 22, as the amount of evaluation point correction 111, based on the positioning correction information for the grid point P1.

Through the process from step S110 to step S120, the correction generation unit 110 generates the amount of evaluation point correction 111 for each positioning satellite 300 among a plurality of satellites 30 and for each evaluation point among the plurality of evaluation points 22.

The correction generation unit 110 outputs the positioning correction information 112 for each grid point P1 to the positioning augmentation generation unit 170.

<Reference Calculation Process S20>

In the reference calculation process S20, the reference calculation unit 120 acquires a geometric distance 225 between the positioning satellite 300 and each of the plurality of evaluation points 22, based on the positioning signal 211 sent out from the positioning satellite 300 and observed at each of the plurality of evaluation points 22. Then the reference calculation unit 120 calculates a difference between the phase pseudorange 223 and the geometric distance 225 as an amount of reference correction 121 for each of the plurality of evaluation points 22.

In step S130, specifically, the reference calculation unit 120 initially acquires the phase pseudorange 223 to the evaluation point 22 found based on the carrier phase of the positioning signal 211, from the correction generation unit 110. Alternatively, the reference calculation unit 120 may calculate the phase pseudorange 223 to the evaluation point 22 based on the carrier phase of the positioning signal 211. The reference calculation unit 120 also acquires the geometric distance 225 between the positioning satellite 300 and the evaluation point 22, from ephemeris information included in the positioning signal 211. The reference calculation unit 120 calculates the difference between the phase pseudorange 223 and the geometric distance 225 as the amount of reference correction 121.

Through the process in step S130, the reference calculation unit 120 generates the amount of reference correction 121 for each positioning satellite among the plurality of positioning satellites 300 and for each evaluation point among the plurality of evaluation points 22.

<Ranging Error Calculation Process S30>

In the ranging error calculation process S30, the ranging error calculation unit 130 removes a bias component due to ambiguity from a difference between the amount of evaluation point correction 111 and the amount of reference correction 121. The ranging error calculation unit 130 calculates the difference from which the bias component due to the ambiguity has been removed, as a ranging error 131 for each of the plurality of evaluation points 22. The ranging error calculation unit 130 calculates the ranging error 131 for each positioning satellite among the plurality of positioning satellites 300 and for each evaluation point among the plurality of evaluation points 22.

In step S140, the ranging error calculation unit 130 removes the bias component due to the ambiguity included in the carrier phase from the difference between the amount of reference correction 121 that is a true amount of correction and the amount of evaluation point correction 111 that is an amount of correction derived from the electronic reference point network. Specifically, the ranging error calculation unit 130 determines the ambiguity with use of a Kalman filter and removes the bias component due to the ambiguity from the difference between the amount of reference correction 121 and the amount of evaluation point correction 111.

Formula 1 and formula 2 below are observation equations for determination of the bias component due to the ambiguity from the difference between the amount of reference correction 121 and the amount of evaluation point correction 111. Formula 1 is an expression based on the phase pseudorange and formula 2 is an expression based on the code pseudorange.

$$\nabla \delta \Phi_{rj}^{s}(t) = \{\nabla \Phi_{rj}^{s}(t) - \nabla \rho_{rj}^{s}(X_r, X^{broadcast}(t))\} - \nabla CPC_{rj}^{s}(t) \cong \quad \text{FORMULA 1}$$
$$-\nabla los_r^{s} \cdot [\delta x, \delta y, \delta z]^T + MF_r^{s} \cdot resT -$$
$$\frac{40.3 \times 10^{16}}{f_j^2} \nabla resI^{s} + \lambda_j \nabla N_j^{s}$$

$$\nabla \delta P_{rj}^{s}(t) = \{\nabla P_{rj}^{s}(t) - \nabla \rho_{rj}^{s}(X_r, X^{broadcast}(t))\} - \nabla PRC_{rj}^{s}(t) \cong \quad \text{FORMULA 2}$$
$$-\nabla los_r^{s} \cdot [\delta x, \delta y, \delta z]^T + MF_r^{s} \cdot resT + \frac{40.3 \times 10^{16}}{f_j^2} \nabla resI^{s}$$

$\nabla \delta \Phi_r^{s}(t)$, $\nabla \delta P_r^{s}(t)$: ranging error in amount of carrier phase correction, ranging error in amount of code pseudorange correction $\nabla \Phi_r^{s}(t)$, $\nabla P_r^{s}(t)$: phase pseudorange, code pseudorange $\nabla CPC_r^{s}(t)$, $\nabla PRC_r^{s}(t)$: amount of carrier phase correction, amount of pseudorange correction $\nabla \rho$: geometric distance $\nabla los$: line-of-sight vector $\lambda_j$: wavelength $\nabla N_j$: carrier phase ambiguity MF: mapping function for troposphere resT: residual in tropospheric delay $\nabla resT$: residual in ionospheric delay $\nabla$: single difference between satellites The correction generation process S10, the reference calculation process S20, and the ranging error calculation process S30 that have been described above will be collectively described below.

In the positioning augmentation device 100 that provides the centimeter level positioning augmentation service, as described above, correction information that may be a reference, that is, the amount of reference correction is calculated besides the positioning correction information generated by the positioning augmentation device 100. The positioning augmentation device 100 then finds the ranging error by making a comparison between the positioning correction information and the amount of reference correction.

In the centimeter level positioning augmentation service, the ranging error is found based on relation between each positioning signal observed on the deemed receiver or the electronic reference point whose position has been known and the geometric distance between the positioning satellite and the deemed receiver. The positioning signal is referred to as GNSS observed data as well. The amount of correction to be used for correction of the error is found, in principle, by use of information in which the position of the deemed receiver has been known for the error included in the phase pseudorange found from the positioning signal. The amount of correction found in such a manner, that is, the amount of reference correction is a physical quantity equivalent to the amount of pseudorange correction that is used in the positioning augmentation service supporting an RTK method or network-type RTK or the amount of carrier phase correction. In calculation of a difference between the positioning correction information that is generated in the centimeter level positioning augmentation service and the amount of reference correction, the positioning augmentation device 100 obtains a single difference between satellites in order to exclude influence due to a receiver error such as a receiver noise. The ambiguity is included in the single difference between satellites and thus the single difference between satellites from which the ambiguity has been removed is found by application of an ambiguity determination method. The positioning augmentation device 100 finds the single difference between satellites on the plurality of evaluation points for each positioning satellite and treats a dispersion in values found on the plurality of evaluation points as the ranging error.

<Anomaly Determination Process S40>

In the anomaly determination process S40, the anomaly determination unit 140 determines whether the positioning satellite 300 is anomalous or not, based on the ranging error 131 for each of the plurality of evaluation points 22.

In step S150, the anomaly determination unit 140 determines positioning satellites 300 that may be determined as anomalous satellites, as candidates for anomalous satellites, from the ranging error 131 for each positioning satellite among the plurality of positioning satellites 300 and for each evaluation point among the plurality of evaluation points 22 in each region. For each region, the anomaly determination unit 140 finds a maximum value of the ranging error 131 for each positioning satellite 300, sets the maximum value as a test statistic, compares the maximum value with a test threshold, and, when the maximum value exceeds the test threshold, treats the positioning satellite as a candidate for the anomalous satellite. The test threshold is set based on requirements on accuracy and integrity of the positioning service or the positioning system. In order that reliability of anomaly detection may be increased, anomaly is not predicated in the process and is finally determined in the alert generation process S50 to be described later.

The anomaly determination unit 140 uses a first threshold 181 as the test threshold. Specifically, the anomaly determination unit 140 makes a comparison between the test statistic for each positioning satellite 300 and the first threshold 181 in each region and determines that there is the anomaly in case where the test statistic is greater than the first threshold 181 in all the regions.

FIG. 5 is a diagram illustrating an example of a determination method in the anomaly determination process S40 according to the present embodiment.

In the anomaly determination process S40, as illustrated in FIG. 5, "0" is set for a positioning satellite in case where the positioning satellite is not a satellite to be augmented in each region or lacks ranging error data. In case where the positioning satellite is a satellite to be augmented in each region and is determined as a normal satellite, that is, a satellite having the test statistic equal to or smaller than the first threshold 181, "1" is set. In case where the positioning satellite is a satellite to be augmented in each region and is determined as an anomalous satellite, that is, a satellite having the test statistic greater than the first threshold 181, "2" is set. For one positioning satellite, it is determined whether the positioning satellite is anomalous or not, based on values "0", "1", or "2" set in the regions. Specifically, in case where "2" is set in all regions except regions where "0" is set as illustrated for a satellite 3 or 4 to be augmented in FIG. 5, the positioning satellite is determined as an anomalous satellite. In case where "0" is set in all the regions as illustrated for a satellite 7 to be augmented in FIG. 5, the positioning satellite is determined as an anomalous satellite.

Subsequently, the anomaly determination process S40 will be described more specifically.

As described above, the positioning augmentation device 100 according to the present embodiment monitors the ranging errors for satellites to be augmented that are augmentation objects and detects positioning satellites having large ranging errors as the anomalous satellites, in order to prevent deterioration in positioning accuracy. The anomalous satellites are detected by the comparison between the ranging error calculated for each positioning satellite and the first threshold. When an anomalous satellite is detected, the positioning augmentation device 100 gives notification to users in order that use of the positioning augmentation information for the anomalous satellite may be avoided.

Specifically, the first threshold in detection of anomalous satellites is ±0.468 m. Hereinbelow, bases for setting of the first threshold will be described.

It is assumed that the ranging errors are normally distributed and that an integrity risk for each GNSS satellite is $1 \times 10^{-4}$/h. Horizontal errors exhibit Rayleigh distribution and vertical errors exhibit Gaussian distribution. Therefore, coefficients that are to protect the horizontal error and the vertical error so as to satisfy the integrity risk are KH=4.29 for horizontal component and KV=3.89 for vertical component. On an assumption that desired accuracy in the centimeter level positioning augmentation service is 6 cm in horizontal and 12 cm in vertical, the first threshold for monitoring of the anomaly in the ranging error such that the desired accuracy may be attained and such that the integrity risk may be satisfied is as represented in <expression 1> and <expression 2> below.

Horizontal component: $HDOP \times URE_H \leq$horizontal accuracy$\times KH$ $URE_H=(6\times4.29)/1.1=23.4$ [cm]   <Expression 1>

Vertical component: $VDOP \times URE_V <$vertical accuracy$\times KV$ $URE_V=(12\times3.89)/1.8 \approx 25.9$ [cm]   <Expression 2>

Herein, the smaller value of 23.4 cm of <expression 1> is adopted in order that both the horizontal error and the vertical error may be protected and 46.8 cm twice as much as 23.4 cm is set as the first threshold for the anomaly detection so that a margin for anomalous notification may be ensured.

A method of setting the first threshold that has been described is an example and the first threshold may be set in accordance with another setting method.

<Alert Generation Process S50>

In the alert generation process S50, the alert generation unit 150 generates an alert 151 based on a result of a determination as to whether each of the plurality of positioning satellites 300 is anomalous or not.

Hereinbelow, prerequisites for the alert generation process S50 will be described.

In the alert generation process S50, in case where a positioning satellite is determined as a candidate for the anomalous satellite, the positioning correction information for the positioning satellite is treated as an invalid value. In case where it is determined that three or more satellites among the satellites to be augmented or a plurality of GNSS are anomalous, treatment as a system anomaly on a side that generates the positioning correction information is given because a probability of such an anomaly occurring is extremely small statistically. Thus the anomaly in the positioning satellite is isolated from the anomaly in a ground system in the alert generation process S50. In case where five or more satellites to be augmented are not ensured after exclusion of the positioning satellites determined as the anomalous satellites, the treatment as a system anomaly on the side that generates the correction information generation is given.

FIG. 6 is a diagram illustrating a specific example of conditions for determination in the alert generation process S50 according to the present embodiment. FIG. 7 is a diagram illustrating a specific example of an alert determination with use of the conditions for determination in the alert generation process S50 according to the present embodiment.

In consideration of the prerequisites described above, the alert determination in the centimeter level positioning augmentation system is as illustrated in FIGS. 6 and 7. In FIG. 7, the alert is determined in cases of (2), (3), (5), and (6). In cases of (1) and (4), the alert is not determined but the anomalous satellites are invalidated and the users are individually notified with use of SSR messages.

Figure 8:
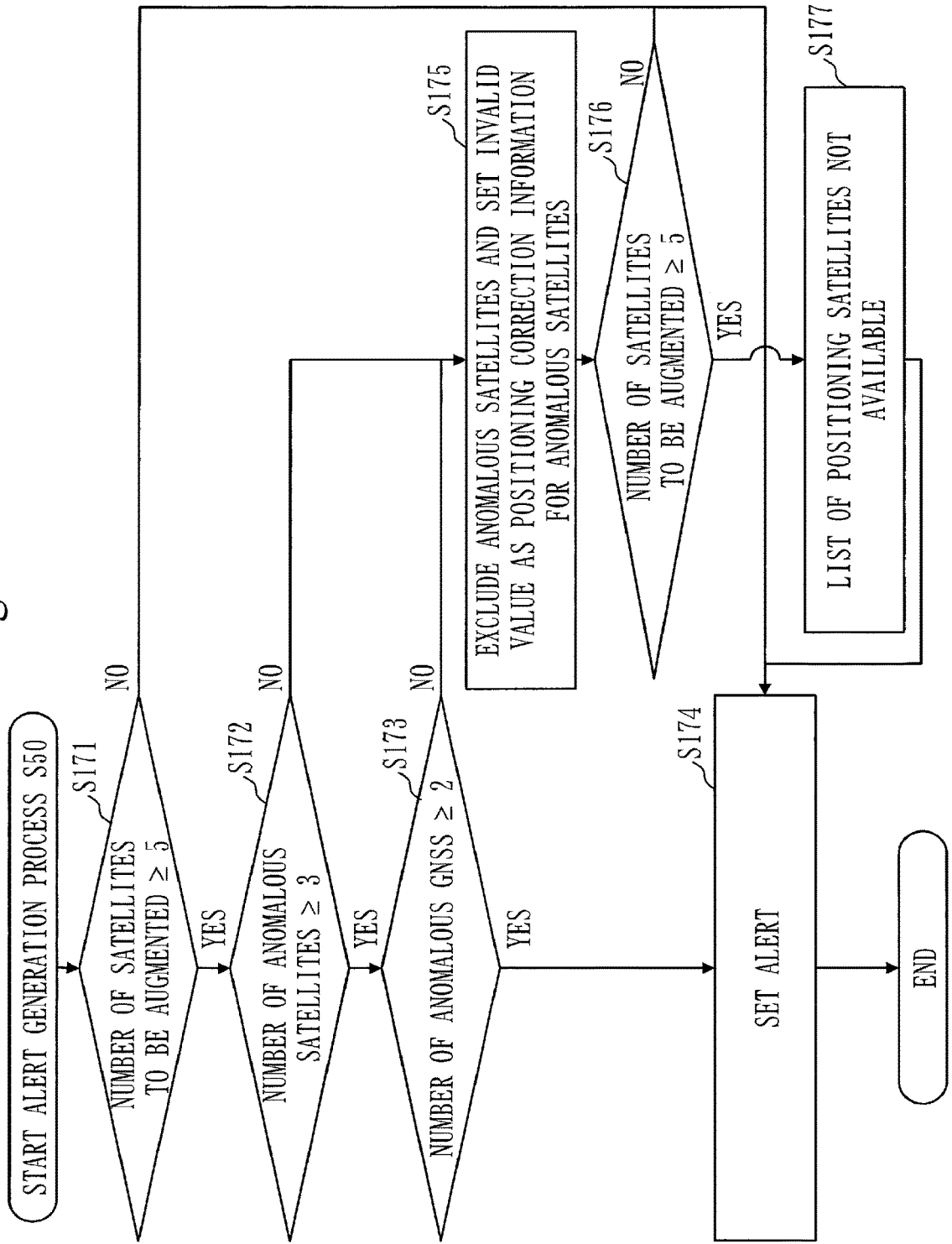
FIG. 8 is a flowchart of the alert generation process S50 according to Embodiment 1.

With use of FIG. 8, the alert generation process S50 according to the present embodiment will be described.

In step S170, the alert generation process S50 is executed.

In the alert generation process S50, the alert generation unit 150 generates the alert 151 indicating impossibility of the positioning with use of the plurality of positioning satellites 300 in case where the plurality of positioning satellites 300 number in five or more, where the positioning satellites determined as the anomalous satellites among the plurality of positioning satellites 300 number in three or more, and where types of the positioning satellites that are determined as the anomalous satellites number in two or more.

In the alert generation process S50, the alert generation unit 150 generates the alert 151 that indicates possibility of the positioning with use of the satellites other than the satellites determined as the anomalous satellites and that includes a list of the positioning satellites determined as the anomalous satellites in case where the plurality of positioning satellites 300 number in five or more, where the positioning satellites that are determined as the anomalous satellites among the plurality of positioning satellites 300 number in less than three, and where the plurality of positioning satellites 300 excluding the positioning satellites determined as the anomalous satellites number in five or more.

In step S171, the alert generation unit 150 determines whether the positioning satellites that are the satellites to be augmented, that is, the plurality of positioning satellites 300 that are the satellites to be augmented number five or more or not. In case where the satellites to be augmented number five or more, the process proceeds to step S172. In case where the satellites to be augmented number less than five, the process proceeds to step S174.

In step S172, the alert generation unit 150 determines whether the anomalous satellites, that is, the positioning satellites determined as the candidates for the anomalous satellites in the anomaly determination process S40 number three or more or not. In case where the anomalous satellites number three or more, the process proceeds to step S173. In case where the anomalous satellites number less than three, the process proceeds to step S175.

In step S173, the alert generation unit 150 determines whether the anomalous GNSS number two or more or not. In case where the anomalous GNSS number two or more, the process proceeds to step S174. In case where the anomalous GNSS number less than two, the process proceeds to step S175. A number of the anomalous GNSS represents a number of the types of the anomalous satellites.

In step S174, the alert generation unit 150 generates the alert 151 indicating impossibility of the positioning by a system in which the positioning augmentation device 100 is used.

In step S175, the alert generation unit 150 excludes the anomalous satellites from the plurality of positioning satellites 300. Then the alert generation unit 150 sets an invalid value as the positioning correction information for the anomalous satellites.

In step S176, the alert generation unit 150 determines whether the plurality of positioning satellites from which the anomalous satellites have been excluded number five or more or not. In case where the plurality of positioning satellites from which the anomalous satellites have been excluded number five or more, the process proceeds to step S177. In case where the plurality of positioning satellites from which the anomalous satellites have been excluded number less than five, the process proceeds to step S174.

In step S177, the alert generation unit 150 indicates that the plurality of positioning satellites resulting from exclusion of the anomalous satellites from the plurality of positioning satellites 300 enable the positioning by the system in which the positioning augmentation device 100 is used and generates the alert 151 that includes the list of the anomalous satellites.

Failures that are detected in the above alert generation process S50 are defined as follows.

The first failure designates a case where the anomalous satellites with the ranging errors exceeding ±0.468 m number three or more and exist in a plurality of GNSS. The second failure designates a case where the normal satellites to be augmented resulting from the exclusion of the anomalous satellites number less than five, even though not applicable to the first failure.

<Integrity Information Generation Process S60>

In the integrity information generation process S60, the integrity information generation unit 160 generates integrity information 161.

The integrity information generation unit 160 generates the integrity information 161 with use of the ranging errors calculated in the ranging error calculation process S30.

Specifically, the integrity information represents a quality indicator for amounts of correction for error factors caused by satellites (the satellite clock error, the satellite orbit error, and the signal bias error), a quality indicator for an amount of correction for the ionospheric delay, and a quality indicator for an amount of correction for the tropospheric delay that are calculated based on frequency-dependent terms and frequency-independent terms classified in accordance with the ranging errors for two frequencies.

Figure 9:
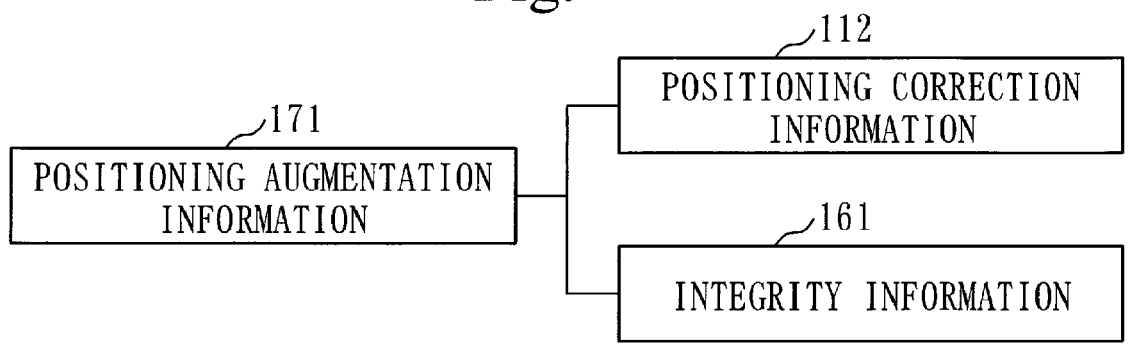
FIG. 9 is a configuration diagram of positioning augmentation information 171 according to Embodiment 1.

FIG. 9 is a configuration diagram of the positioning augmentation information 171 according to the present embodiment. As illustrated in FIG. 9, the positioning augmentation information 171 is composed of the positioning correction information 112 and the integrity information 161.

<Positioning Augmentation Generation Process S70>

In the positioning augmentation generation process S70, the positioning augmentation generation unit 170 acquires the positioning correction information 112 generated by the correction generation unit 110, the alert 151 generated by the alert generation unit 150, and the integrity information 161 generated by the integrity information generation unit 160. The positioning augmentation generation unit 170 generates the positioning augmentation information 171 to be transmitted on an augmentation signal, based on the positioning correction information 112, the alert 151, and the integrity information 161 for each positioning satellite.

The positioning augmentation information 171 is composed of the positioning correction information 112 and the integrity information 161 for each positioning satellite. The positioning augmentation generation unit 170 generates the positioning augmentation information 171 for only the normal positioning satellites and distributes the positioning augmentation information 171 to the users with use of the positioning satellites. In case where a determination as a system anomaly is made in the alert generation process S50, an alert flag indicating the system anomaly is set up and notification is given in order that the positioning correction information 112 may not be used on a side of the users.

Herein, a specific example of an integrity scheme in the positioning augmentation device 100 according to the present embodiment will be described.

An integrity function in the centimeter level positioning augmentation system is implemented by an alert flag scheme with use of the alert flag and a message scheme and is provided as the positioning augmentation information 171 for the users.

Definitions of the schemes will be described below.

<Alert Flag Scheme>

The alert flag is one-bit information indicating comprehensive health of satellite, ground, and external systems according to the centimeter level positioning augmentation system. The alert flag being 1 indicates a situation in which an alarm is to be raised for the users and in which use of the service should be avoided. Terminals of the users may be provided with a function of raising the alarm with use of the alert flag or the like, as appropriate.

<Message Scheme>

Quality indicators of the positioning correction information corresponding to error factors of the global errors that are common to all the regions and the local errors such as the ionospheric error and the tropospheric error that are unique to a region are transmitted as messages.

When it is determined on a satellite system side that there are no messages to be transmitted to the users at broadcasting time, a null message is automatically transmitted. The terminals of the users may be provided with a function of raising an alarm when receiving the null message or the like, as appropriate.

Above description on the positioning augmentation process S100 according to the present embodiment has been completed.

\*\*\*Other Configurations\*\*\*

The positioning augmentation device 100 may include ports to be connected to input devices such as a mouse, a keyboard, and a touch panel, as input interfaces. Specifically, the input interfaces are USB (Universal Serial Bus) terminals. The input interfaces may be ports to be connected to a LAN (Local Area Network).

Though the functions of "the units" of the positioning augmentation device 100 are implemented by the software in the present embodiment, the functions of "the units" of the positioning augmentation device 100 may be implemented by hardware in a modification.

With use of FIG. 10, a configuration of the positioning augmentation device 100 according to the modification of the present embodiment will be described.

Figure 10:
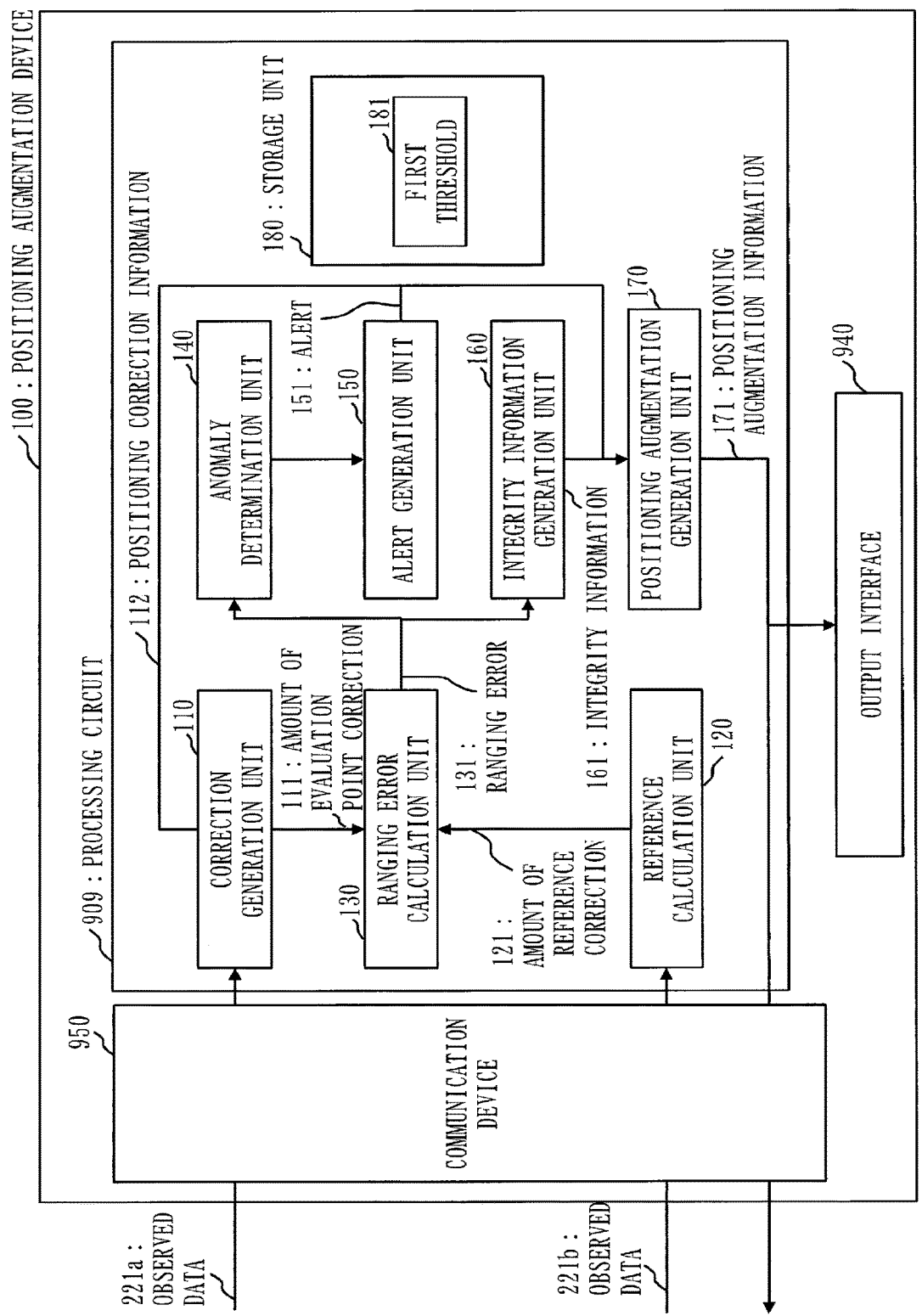
FIG. 10 is a configuration diagram of the positioning augmentation device 100 according to a modification of Embodiment 1.

As illustrated in FIG. 10, the positioning augmentation device 100 includes the hardware such as a processing circuit 909, the output interface 940, and the communication device 950.

The processing circuit 909 is a dedicated electronic circuit that implements the functions of "the units" described above and the storage unit 180. Specifically, the processing circuit 909 is a single circuit, a composite circuit, a programmed processor, a parallelly programmed processor, a logic IC, a GA (Gate Array), an ASIC (Application Specific Integrated Circuit), or an FPGA (Field-Programmable Gate Array).

The functions of "the units" may be implemented by the one processing circuit 909 or may be implemented by being distributed among a plurality of processing circuits 909.

In another modification, the functions of the positioning augmentation device 100 may be implemented by a combination of software and hardware. That is, some functions of the positioning augmentation device 100 may be implemented by dedicated hardware and the remaining functions may be implemented by software.

The processor 910, the storage device 920, and the processing circuit 909 are collectively referred to as "processing circuitry". That is, the functions of "the units" and the storage unit 180 are implemented by the processing circuitry, whichever of the configurations illustrated in FIGS. 3 and 10 the configuration of the positioning augmentation device 100 is.

The "unit" may be read as "step", "procedure", or "process". The functions of "the units" may be implemented by firmware.

Description of Effects of Present Embodiment

According to the positioning augmentation device 100 of the present embodiment, as described above, the ranging error in the phase pseudorange obtained from the carrier phase may be accurately calculated.

The positioning augmentation device 100 according to the present embodiment may prevent use of anomalous positioning correction information on the side of the users, may enable reliable positioning, and may increase an implementation rate and reliability of the positioning based on the carrier phase.

In the embodiment described above, each of "the units" as an independent functional block forms the positioning augmentation device. Such a configuration as the embodiment described above, however, is not essential but any configuration may be adopted for the positioning augmentation device. Any functional blocks may be used for the positioning augmentation device, as long as the functions described in relation to the embodiment described above may be fulfilled. The positioning augmentation device may be configured with use of any other combinations of or any block configuration of the functional blocks.

The positioning augmentation device may be a system composed of a plurality of devices, instead of being one device.

Though Embodiment 1 has been described, a plurality of parts of the embodiment may be embodied in combination. Alternatively, a part of the embodiment may be embodied. Otherwise, the embodiment may be entirely or partially embodied in any combination.

The above-described embodiment, which intrinsically adduces a preferred example, is not intended for limiting scopes of the invention, applications thereof, and uses therefor and various modifications may be made thereto as appropriate.

REFERENCE SIGNS LIST

100: positioning augmentation device; 110: correction generation unit; 111: amount of evaluation point correction; 112: positioning correction information; 120: reference calculation unit; 121: amount of reference correction; 130: ranging error calculation unit; 131: ranging error; 140: anomaly determination unit; 150: alert generation unit; 151: alert; 160: integrity information generation unit; 161: integrity information; 170: positioning augmentation generation unit; 171: positioning augmentation information; 180: storage unit; 181: first threshold; 21: electronic reference point; 200: electronic reference point network; 211: positioning signal; 221, 221a, 221b: observed data; 223: phase pseudorange; 225: geometric distance; 22: evaluation point; 220: deemed receiver; 300: positioning satellite; 510: positioning augmentation method; 520: positioning augmentation program; 700: centimeter level positioning augmentation system; 800: region; 909: processing circuit; 910: processor; 920: storage device; 921: memory; 922: auxiliary storage device; 940: output interface; 950: communication device; S100: positioning augmentation process; S10: correction generation process; S20: reference calculation process; S30: ranging error calculation process; S40: anomaly determination process; S50: alert generation process; S60: integrity information generation process; S70: positioning augmentation generation process.

The invention claimed is:

1. A positioning augmentation device to augment positioning with use of a plurality of positioning satellites and in a region including a plurality of electronic reference points and a plurality of evaluation points whose position coordinates are respectively specified, the positioning augmentation device comprising:
    processing circuitry
    to generate an amount of correction for a phase pseudorange between the positioning satellite and each of the plurality of evaluation points, as an amount of evaluation point correction for each of the plurality of evaluation points, based on a carrier phase of a positioning signal sent out from the positioning satellite and observed at each of the plurality of electronic reference points,
    to acquire a geometric distance between the positioning satellite and each of the plurality of evaluation points, based on the positioning signal sent out from the positioning satellite and observed at each of the plurality of evaluation points, and to calculate a difference between the phase pseudorange and the geometric distance as an amount of reference correction for each of the plurality of evaluation points,
    to remove a bias component due to ambiguity from a difference between the amount of evaluation point correction and the amount of reference correction and to calculate the difference from which the bias component due to the ambiguity has been removed, as a ranging error at each of the plurality of evaluation points, and
    to generate an alert indicating impossibility of the positioning with use of the plurality of positioning satellites, in accordance with a number of satellites or a number of types of the satellites, among the plurality of positioning satellites, that are determined as anomalous based on the ranging error.

2. The positioning augmentation device according to claim 1, wherein
    the processing circuitry generates the alert indicating impossibility of the positioning with use of the plurality of positioning satellites in case where the plurality of positioning satellites number in five or more, where satellites that are determined as anomalous satellites among the plurality of positioning satellites number in three or more, and where types of the satellites that are determined as the anomalous satellites number in two or more.

3. The positioning augmentation device according to claim 1, wherein
    the processing circuitry generates the alert indicating possibility of positioning with use of the positioning satellites other than the satellites determined as the anomalous satellites and including a list of the satellites determined as the anomalous satellites in case where the plurality of positioning satellites number in five or more, where the satellites that are determined as the anomalous satellites among the plurality of positioning satellites number in less than three, and where the plurality of positioning satellites excluding the satellites determined as the anomalous satellites number in five or more.

4. The positioning augmentation device according to claim 1, wherein
    the processing circuitry determines whether the positioning satellite is anomalous or not, based on the ranging error at each of the plurality of evaluation points.

5. The positioning augmentation device according to claim 4, wherein
    the processing circuitry generates the alert indicating impossibility of the positioning with use of the plurality of positioning satellites in case where the plurality of positioning satellites number in five or more, where satellites that are determined as anomalous satellites among the plurality of positioning satellites number in three or more, and where types of the satellites that are determined as the anomalous satellites number in two or more.

6. The positioning augmentation device according to claim 4, wherein
    the processing circuitry generates the alert indicating possibility of positioning with use of the positioning satellites other than the satellites determined as the anomalous satellites and including a list of the satellites determined as the anomalous satellites in case where the plurality of positioning satellites number in five or more, where the satellites that are determined as the anomalous satellites among the plurality of positioning satellites number in less than three, and where the plurality of positioning satellites excluding the satellites determined as the anomalous satellites number in five or more.

7. The positioning augmentation device according to claim 4, wherein
the processing circuitry determines that the ranging error at each of the plurality of evaluation points is anomalous, in case where the ranging error at each of the plurality of evaluation points is greater than a first threshold.

8. The positioning augmentation device according to claim 7, wherein
the processing circuitry generates the alert indicating impossibility of the positioning with use of the plurality of positioning satellites in case where the plurality of positioning satellites number in five or more, where satellites that are determined as anomalous satellites among the plurality of positioning satellites number in three or more, and where types of the satellites that are determined as the anomalous satellites number in two or more.

9. The positioning augmentation device according to claim 7, wherein
the processing circuitry generates the alert indicating possibility of positioning with use of the positioning satellites other than the satellites determined as the anomalous satellites and including a list of the satellites determined as the anomalous satellites in case where the plurality of positioning satellites number in five or more, where the satellites that are determined as the anomalous satellites among the plurality of positioning satellites number in less than three, and where the plurality of positioning satellites excluding the satellites determined as the anomalous satellites number in five or more.

10. The positioning augmentation device according to claim 7, wherein
the positioning augmentation device augments positioning with use of the plurality of positioning satellites, and
the processing circuitry
calculates the ranging error for each satellite among the plurality of positioning satellites and for each evaluation point among the plurality of evaluation points, and
determines whether each of the plurality of positioning satellites is anomalous or not.

11. The positioning augmentation device according to claim 10, wherein
the processing circuitry generates the alert indicating impossibility of the positioning with use of the plurality of positioning satellites in case where the plurality of positioning satellites number in five or more, where satellites that are determined as anomalous satellites among the plurality of positioning satellites number in three or more, and where types of the satellites that are determined as the anomalous satellites number in two or more.

12. The positioning augmentation device according to claim 10, wherein
the processing circuitry generates the alert indicating possibility of positioning with use of the positioning satellites other than the satellites determined as the anomalous satellites and including a list of the satellites determined as the anomalous satellites in case where the plurality of positioning satellites number in five or more, where the satellites that are determined as the anomalous satellites among the plurality of positioning satellites number in less than three, and where the plurality of positioning satellites excluding the satellites determined as the anomalous satellites number in five or more.

13. The positioning augmentation device according to claim 4, wherein
the positioning augmentation device augments positioning with use of the plurality of positioning satellites, and
the processing circuitry
calculates the ranging error for each satellite among the plurality of positioning satellites and for each evaluation point among the plurality of evaluation points, and
determines whether each of the plurality of positioning satellites is anomalous or not.

14. The positioning augmentation device according to claim 13, wherein
the processing circuitry generates the alert indicating possibility of positioning with use of the positioning satellites other than the satellites determined as the anomalous satellites and including a list of the satellites determined as the anomalous satellites in case where the plurality of positioning satellites number in five or more, where the satellites that are determined as the anomalous satellites among the plurality of positioning satellites number in less than three, and where the plurality of positioning satellites excluding the satellites determined as the anomalous satellites number in five or more.

15. The positioning augmentation device according to claim 13, wherein
the processing circuitry generates the alert indicating impossibility of the positioning with use of the plurality of positioning satellites in case where the plurality of positioning satellites number in five or more, where satellites that are determined as anomalous satellites among the plurality of positioning satellites number in three or more, and where types of the satellites that are determined as the anomalous satellites number in two or more.

16. A positioning augmentation method for a positioning augmentation device to augment positioning with use of a plurality of positioning satellites and in a region including a plurality of electronic reference points and plurality of evaluation points whose position coordinates are respectively specified, the positioning augmentation method comprising:
generating an amount of correction for a phase pseudorange between the positioning satellite and each of the plurality of evaluation points, as an amount of evaluation point correction for each of the plurality of evaluation points, based on a carrier phase of a positioning signal sent out from the positioning satellite and observed at each of the plurality of electronic reference points,
acquiring a geometric distance between the positioning satellite and each of the plurality of evaluation points, based on the positioning signal sent out from the positioning satellite and observed at each of the plurality of evaluation points, and calculating a difference between the phase pseudorange and the geometric distance as an amount of reference correction for each of the plurality of evaluation points,
removing a bias component due to ambiguity from a difference between the amount of evaluation point correction and the amount of reference correction and calculating the difference from which the bias component due to the ambiguity has been removed, as a ranging error at each of the plurality of evaluation points; and generating an alert indicating impossibility of the positioning with use of the plurality of positioning satellites, in accordance with a number of satellites or a number of types of the satellites, among the plurality of positioning satellites, that are determined as anomalous based on the ranging error.

17. A non-transitory computer readable medium storing a positioning augmentation program for a positioning augmentation device to augment positioning with use of a plurality of positioning satellites and in a region including a plurality of electronic reference points and a plurality of evaluation points whose position coordinates are respectively specified, the positioning augmentation program that causes the positioning augmentation device being a computer to execute:

a correction generation process of generating an amount of correction for a phase pseudorange between the positioning satellite and each of the plurality of evaluation points, as an amount of evaluation point correction for each of the plurality of evaluation points, based on a carrier phase of a positioning signal sent out from the positioning satellite and observed at each of the plurality of electronic reference points, a reference calculation process of acquiring a geometric distance between the positioning satellite and each of the plurality of evaluation points, based on the positioning signal sent out from the positioning satellite and observed at each of the plurality of evaluation points, and calculating a difference between the phase pseudorange and the geometric distance as an amount of reference correction for each of the plurality of evaluation points, a ranging error calculation process of removing a bias component due to ambiguity from a difference between the amount of evaluation point correction and the amount of reference correction and calculating the difference from which the bias component due to the ambiguity has been removed, as a ranging error at each of the plurality of evaluation points, and an alert generation process of generating an alert indicating impossibility of the positioning with use of the plurality of positioning satellites, in accordance with a number of satellites or a number of types of the satellites, among the plurality of positioning satellites, that are determined as anomalous based on the ranging error.

* * * * *